United States Patent [19]

Duranton

[11] Patent Number: 5,479,621

[45] Date of Patent: Dec. 26, 1995

[54] DATA PROCESSOR, FOR USE WITH A CHAINED LANGUAGE, WITH APPARATUS FOR DISTINGUISHING DIRECTLY EXECUTABLE INSTRUCTIONS FROM INSTRUCTIONS REQUIRING A SUB-ROUTINE CALL

[75] Inventor: Marc Duranton, Boissy Saint Leger, France

[73] Assignee: U.S. Philips Corporation, New York, N.Y.

[21] Appl. No.: 286,102

[22] Filed: Aug. 4, 1994

Related U.S. Application Data

[63] Continuation of Ser. No. 896,948, Jun. 11, 1992, abandoned.

[30] Foreign Application Priority Data

Jun. 28, 1991 [FR] France .................. 91 08062

[51] Int. Cl.$^6$ .................................. G06F 9/30
[52] U.S. Cl. ........................... 395/375; 395/500
[58] Field of Search .................... 395/375, 500, 395/425, 800

[56] References Cited

U.S. PATENT DOCUMENTS

| | | | |
|---|---|---|---|
| 3,958,222 | 5/1976 | Messina et al. | 395/425 |
| 4,070,703 | 1/1978 | Negi | 395/375 |
| 4,415,969 | 11/1983 | Bayliss et al. | 395/375 |
| 4,462,073 | 7/1984 | Grondalski | 395/375 |
| 4,499,604 | 2/1985 | Clancy et al. | 395/375 |
| 4,514,800 | 4/1985 | Gruner et al. | 395/375 |
| 4,785,392 | 11/1988 | Maier et al. | 395/375 |
| 4,794,522 | 12/1988 | Simpson | 395/500 |
| 4,841,476 | 6/1989 | Mitchell et al. | 395/500 |
| 4,972,317 | 11/1990 | Buonomo et al. | 395/375 |
| 4,992,934 | 2/1991 | Portanova et al. | 395/375 |
| 5,070,451 | 12/1991 | Moore et al. | 395/375 |
| 5,210,832 | 5/1993 | Maier et al. | 395/375 |
| 5,218,687 | 6/1993 | Ducousso et al. | 395/425 |

FOREIGN PATENT DOCUMENTS 0185215   11/1984   European Pat. Off. .......... G06F 9/44

OTHER PUBLICATIONS

Tanenbaum, "Structured Computer Organization", Prentice–Hall 1984, pp. 10–12.

"An 8–Kbit Content Addressable and Reentrant Memory" Kadota et al., IEEE Journal, vol. 20, No. 5, Oct. 1985, pp. 951–957.

"Go Fast, Go Forth" Dettmer, IEEE Journal, Review Dec. 1988.

"A Content Addressable Memory . . . " Goksel et al. IEEE Journal, vol. 24, No. 3, pp. 592–596, Jun. 1989.

*Primary Examiner*—Parshotam S. Lall
*Assistant Examiner*—Viet Vu
*Attorney, Agent, or Firm*—Anne E. Barschall

[57] ABSTRACT

Data processing device, more particularly adapted to a chained language, especially of the FORTH type.

This data processing device, more particularly adapted to a chained computer language, especially of the FORTH type includes:

- a main memory (10) for containing an execution program with its instruction data formed by a plurality of instructions which are directly executable or indirectly executable, the latter being arranged in at least one sub-program,
- a first stack-type memory (30) for containing the address following the address calling a sub-program (return address),
- one or several operational units (40) for executing the instructions which can be directly executed, each of which may contain:
- a second stack-type memory (20) for containing parameters used by the said program,
- an instruction-decoding member (40) for decoding each instruction data coming from the main memory.

8 Claims, 4 Drawing Sheets

| @ | D |
|---|---|
| | ⋮ |
| @ * | INM 1 |
| | ⋮ |
| @ * F | ﴾ |
| | ⋮ |
| @ carré | DUP |
| @ carré +1 | @ * |
| @ carré F | ﴾ |
| | ⋮ |
| @ P4 | @ carré |
| @ P4+1 | @ carré |
| @ P4+2 | ﴾ |
| | ⋮ |
| @ APPEL -2 | CONST |
| @ APPEL -1 | a |
| @ APPEL | @ P4 |
| | ⋮ |

FIG.2

| |
|---|
| CONST |
| LIM |
| CONST |
| INDX |
| >R |
| >R |
| LOOP |
| @ CALL |
| R> |
| R> |

FIG.6

DATA PROCESSOR, FOR USE WITH A CHAINED LANGUAGE, WITH APPARATUS FOR DISTINGUISHING DIRECTLY EXECUTABLE INSTRUCTIONS FROM INSTRUCTIONS REQUIRING A SUB-ROUTINE CALL

This is a continuation of application Ser. No. 07/896,948, filed on Jun. 11, 1992, abandoned.

BACKGROUND OF THE INVENTION

1. Field to the invention

The invention relates to a data processing device, more particularly adapted to a chained computer language, especially of the FORTH type, which device comprises inter alia:
- a main memory for containing an execution program with its instruction data formed by a plurality of instructions which are directly executable or indirectly executable, the latter being arranged in at least one sub-program,
- a first stack-type memory for containing the address following the address calling a sub-program (return address),
- one or several operational units for executing the instructions which can be directly executed, each of which may contain:
- a second stack-type memory for containing parameters used by the said program,
- an instruction-decoding member for decoding each instruction data coming from the main memory.

2. Related Art

Such a device is described in European Patent no. 0 185 215.

To design an execution program, the programmer or language compiler must know the hardware resources with which the device operates. Thus he must know whether each particular instruction can be directly executed or whether it must be diverted to a sub-program which carries out the function by means of directly executable instructions. For example, if a multiplier member is provided in the device, the multiplication operation is directly executable, but if this member is absent, it is necessary to call a multiplication sub-program which operates by successive addition and shift operations. This choice is laid down by means of a binary element incorporated in the instruction put in by the programmer for indicating whether the instruction is directly or indirectly executable. In other words, it is necessary to compile with an indicator for providing either directly executable instructions or a reference to a library which emulates the absent instruction.

The fact that the user must know the resources forms a first disadvantage.

A second disadvantage connected therewith is that the program, once established, can only function with the device in conjunction with the environment for which the program was designed, and addition of other material resources means that the program must be written or compiled anew.

SUMMARY OF THE INVENTION

The invention proposes a device of the kind mentioned in the opening paragraph which to a large extent counteracts the above disadvantages.

For this purpose, such a device is characterized in that it is provided with means for regarding the instructions which it cannot execute directly as addresses of a sub-program.

Thus the idea of the invention is to consider each instruction data as a procedural address. Accordingly, there are no instructions in the proper sense of the term anymore.

BRIEF DESCRIPTION OF THE DRAWINGS

The following description in conjunction with the annexed drawings, all given by way of non-limitative example, will give a clear understanding of how the invention may be put into practice.

FIG. 2 shows the input of instruction data into the main memory.

FIG. 6 shows the input into a memory for the execution of a program loop.

DESCRIPTION OF A PREFERRED EMBODIMENT

Figure 1:
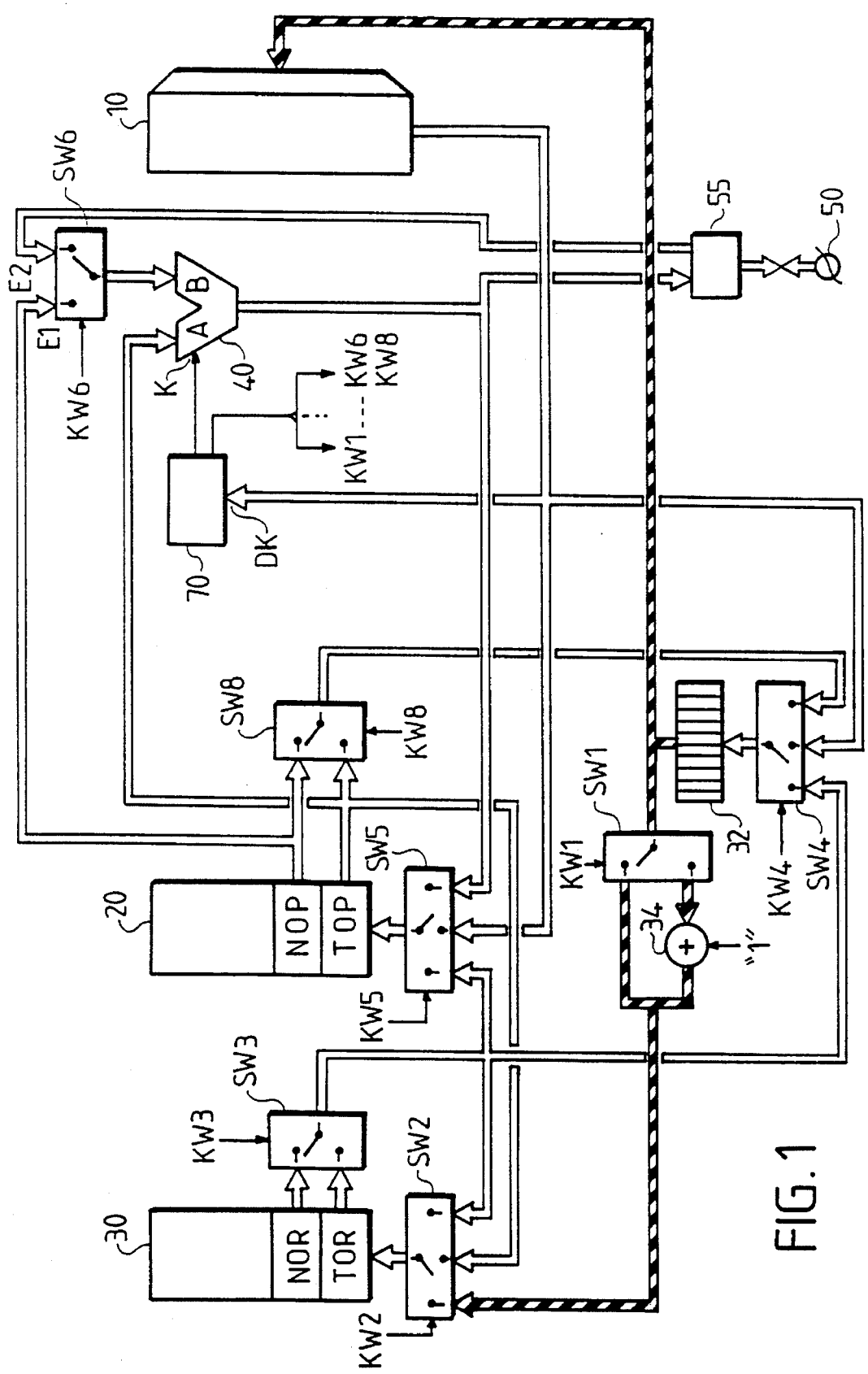
FIG. 1 shows the diagram of a first data processing device according to the invention.

The data processing device shown in FIG. 1 consists first of all of a main memory 10 containing the instruction data. FIG. 2 shows a series of such data by way of example showing a program P4 which calculates the forth power of a number "@", i.e. calculating $a^4$. In FIG. 2, the column @ indicates the address and D the data present at this address. Thus the program P4 is called at the address @APPEL and comprises other sub-programs which will be explained in detail below. This structure of instructions is found in so-called "chained" languages. The instructions in question as well as *, DUP conform to the notation in the FORTH language.

The device of FIG. 1 in addition comprises a first stack-type memory 20 (last in, first out) provided for containing parameters and, in the example described, more particularly the number a will be found here; a second memory 30 also of the stack type is provided for containing the addresses of sub-programs and cooperates with a register 32 of addresses and instruction data. The contents of the register 32 can optionally be incremented by one by means of an adder 34. In either case the contents can be transferred to switch SW2 which is connected to the input of the memory 30. The last received information put in is put in the position TOR while the penultimate position is referenced NOR. A switch SW3 selects the data contained in the position NOR or TOR, then sends this to the register 32 v/a another switch SW4.

Similarly, the references TOP and NOP indicate the ultimate and penultimate positions at which parameters are stored in the memory 20. A three-position switch SW5 allows selection of the data to be stacked in the memory 20. These data derive either from the memory 10 or from an operational unit 40 or from the output of the switch SW3. Unit 40 is provided with two operand inputs A and B. Input A is connected to the position TOP of the memory 20, while input B is connected to the output of a switch SW6 which has two inputs E1 and E2. Input E1 is connected to the position NOP of the memory 20, and input E2 is connected to the external access 50 v/a an input/output unit 55. This unit also transmits the output information from the operational unit 40 to the access 50. The switch SW2 allows to select among data from the register 32, data from the output of switch SW3 and data contained in the position TOP of memory 20. A switch SW4 allows filling of the register 32 with data either from memory 10, or with data present at the output of switch SW3 or from switch SW8 which selects the dam contained in positions NOP and TOP of the memory 20.

The various switches SW1 to SW6 and SW8 are provided with respective position controls KW1 to KW6 and KW8.

The operational unit 40 is provided with a command input K which receives the command data from an instruction decoding unit 70 whose input DK is connected to the output of the memory 10 and which provides the different signals KW1 to KW6, KW8 from the instructions to be carried out.

Figure 3:
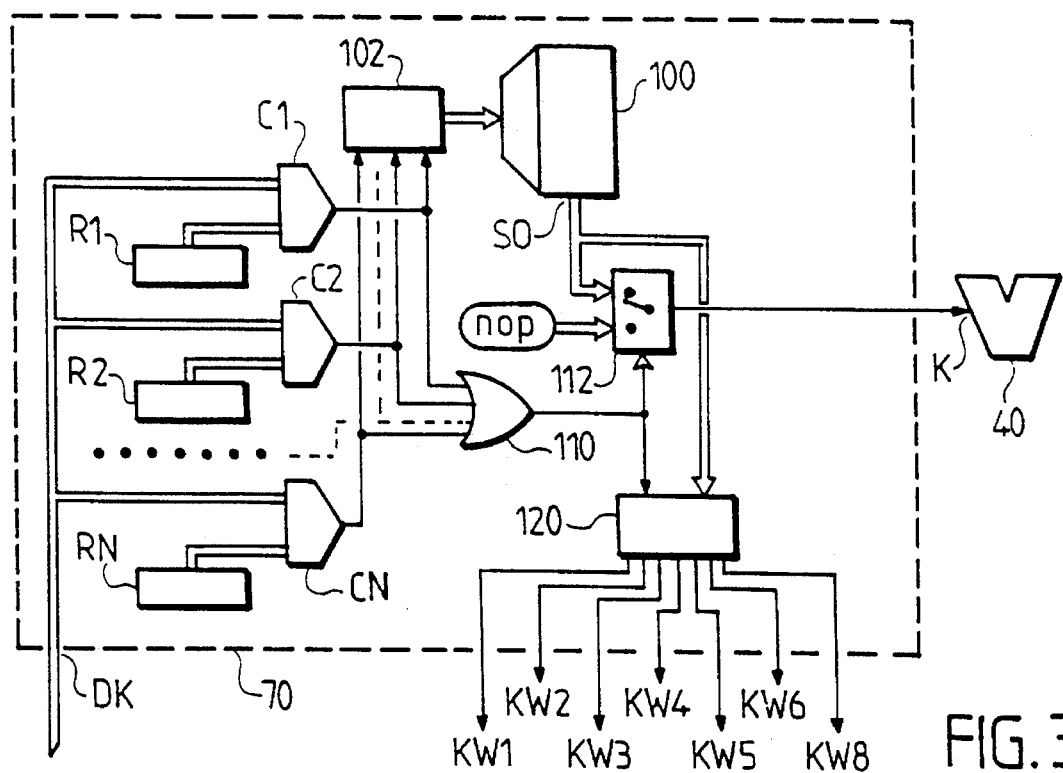
FIG. 3 shows the decoding unit in more detail.

According to the invention, the instruction decoding unit 70 is advantageously realised on the basis of an associative memory of which an equivalent diagram is shown in FIG. 3.

This associative memory is formed from a memory block 100 provided with an output SO which can provide a code so that the operations to be carried out by the unit 40 can take place. Meanwhile, the input code connected to the access DK is compared with all execution codes which can be directly executed by the unit 40. All these execution codes are contained in the registers R1 to RN and comparators C1 to CN carry out the comparison between the contents of these registers and the input code present at the input DK. A decoder 102 uses the results of these comparisons for generating the address of the memory 100 so that the latter gives the corresponding instruction v/a switch 112 to the unit 40. An OR-gate 110, for example, receives the result of these comparisons. If the input code is recognized, the output of the storage block is recognized and its output code(s) is (are) enabled and leave(s) the block 100 to enter the unit 40 at input K. If the input code is not recognized, a non-operative code (NOP) is then applied to the input K, while the non-decoding address controls switch 112 to transfer the non-operative code NOP. The signals emanating from gate 110 and from the output SO of the memory 100 are transferred to a switching control unit 120 which provides the signals KW1 to KW6 and KW8.

The decoding of instructions may be realised by any other decoding method, programmable or not. The sets R1, . . . , RN; C1, . . . , CN may be realised by any associative storage structure. For the purposes of the invention, the decoding method advantageously is a programmable one.

For each change in the equipment, it suffices to modify the contents of the associative memory only. A program thus consists of: a list of "instructions", which is independent of the processor used (limited to the extent to which the latter has common elementary instructions), and a table fried in the "associative memory" which reflects the characteristic properties of the machine. This is advantageous in the case of sale of ready-made programs. The modification of the equipment does not require a recompilation of the application, but only the modification of the contents of the associative memory (a few octets).

The operation of the device according to the invention will now be explained with reference to the program example shown in FIG. 2, i.e. raising a number "a" to the forth power, so calculation of $a^4$.

First, the basic operation of the device according to the invention will be explained. Unless the contrary is proven, the device considers that each and every output data of (10) is an address calling a sub-program. Now, in the operations listed below, (32) indicates the contents of register 32, $[@(32)]_{10}$ indicates the contents of the memory 10 at the address indicated by the contents of the register 32.

| | |
|---|---|
| .(32) + 1 → TOR: | the next address is stacked |
| .$[@(32)]_{10}$: | is analysed by block 70 so as to determine whether it is an instruction or a call to a sub-program. |

If it is a call to sub-program (not recognized by the associative memory as an instruction which can be executed by the hardware):

$[@(32)]_{10}$ → 32 and the cycle is restarted.

If it is an instruction, it may appear in two versions: return or non-return.

non-return version: the operations are carried out in sequence.
    .$[@(32)]_{10}$ is executed by the unit 40
    .TOR → 32 the register 32 is filled with the address of the next instruction (a single data element is stacked).
return version: in this case a return to the sub-program is made simultaneously with the decoded operation.
    .$[(32)]_{10}$ is executed by 40
    .NOR → 32: unstacking of two data in the memory 30.

A return is made to the address calling the sub-program. This mechanism can be seen in the framework of the program example. More information can be found in annex I.

It is assumed that initially the contents of the register 32 are APPEL-2 (CALL-2), which is an address code written @APPEL-2 for an instruction data contained in the memory 10. A symbol at this address, for example CONST, means that the next data is a constant and that it must be stored at the position TOP in the memory 20. The operational steps are explained below by means of comments relative to the program steps shown in more detail in annex II.

| Program step | Comment |
|---|---|
| 1- | The value @APPEL-2 augmented by one is transferred to the position TOR of the memory 30. A stacking thus takes place at the position TOR, and the code [APPEL-1] is obtained. |
| 2- | The contents of the memory 10 at the address @APPEL-2 is analysed as being the precursor of a constant. |

-continued

| Program step | Comment |
|---|---|
| 3- | The value @APPEL-1 now indicates the value "a" present in the memory 10. Unstacking is thus achieved. |
| 4- | The value @APPEL-1 augmented by one is transferred to the position TOR of the memory 30 (stacking). |
| 5- | The constant "a" is moved to the position TOP of memory 20 (the precursor of step 2 has switched the switches SW3). |
| 6- | The contents of the register 32 are @APPEL, which corresponds to raising "a" to the forth power, the code contained therein corresponds to an address of the sub-program @P4 (primitive recursive function). |
| 7- | The address @APPEL incremented by one is put in the position TOR. |
| 8- | The contents of memory 10 at the address @APPEL are analysed; since this code is not recognized as being directly executable, it is considered to be an address. |
| 9- | The address @P4 is put in the register 32. |
| 10- | The address @P4 incremented by one is stacked. |
| 11- | The contents of the memory 10 at the address @P4 is analysed as being an address. |
| 12- | The address @carré ("square") is put in the register 32. |
| 13- | The address @carré augmented by one is stacked. |
| 14- | The instruction DUP is analysed, it is a primitive instruction. This instruction, accordingly, is executed. |
| 15- | Moving on to the next instruction. |
| 16- | The return address is stacked in the memory 10. |
| 17- | The examination of the instruction requires a sub-program. |
| 18- | The address of this sub-program is put in the register 32 that the first multiplication instruction INM1 is at the output of the memory 10. The multiplication is effected by means of successive additions and decoding actions as is known to those skilled in the art. |
| 19- | After that, the return instruction is reached. |
| 20- | The form of this instruction is examined. |
| 21- | After two unstacking operations, the return to the sub-program has been made. |
| 22- | The return instruction IR is made available. |
| 23- | It is examined. |
| 24- | — |
| 25- | — |
| 26- | The "carré" sub-program is called, which starts with |
| 27- | the instruction DUP. The program then continues as from step 13 ff. up to the point where a new carré (square) is called. |
| 28- | Accordingly, the return of the sub-program is found again. |
| 29- | The instruction is examined, return of the sub-program. |
| 30- | Two elements are unstacked. |
| 31- | The return instruction is subsequently obtained |
| 32- | and is examined. |
| 33- | Continuation of the program. |

The program is concluded.

It should be noted that each instruction is composed of the following cycles:

---

.(32) + 1 → TOR which is a stacking cycle for the contents of the register 31 augmented by one.
.[@(32)]$_{10}$ which is the examination and analysis of the instruction.
.Then the branch instruction and entering a new value in the register 32.

---

Three cases are distinguished here:

a) [@(32)]$_{10}$ defines a call of a sub-program.

b) (TOR)→32 implies the sequential execution of the next instruction with unstacking.

c) (NOR)→32 relates to a return of the sub-program with unstacking of two elements of the return memory 30.

Other operations may be carried out by the device according to the invention shown in FIG. 1. This is shown in annex I.

The operation of a device comprising means for executing a minimum number of instructions has been explained here. It should be noted, that the program discussed here may be executed with the same instructions by a device according to the invention which also comprises additional means; for example, the operational unit 40 may comprise means for carrying out multiplications.

The program will then be executed in the following manner:

| | |
|---|---|
| 1 to 16- | Identical |
| 17-[@(32)]$_{10}$ | Is analysed then as an instruction which is directly executable, the symbol "*" is not regarded as an address, but the operation is carried out. |

The application code remains unchanged, only the contents of the instruction decoder 70 are modified when a piece of equipment is added to the device (in this case, a wired multiplier).

Figure 4:
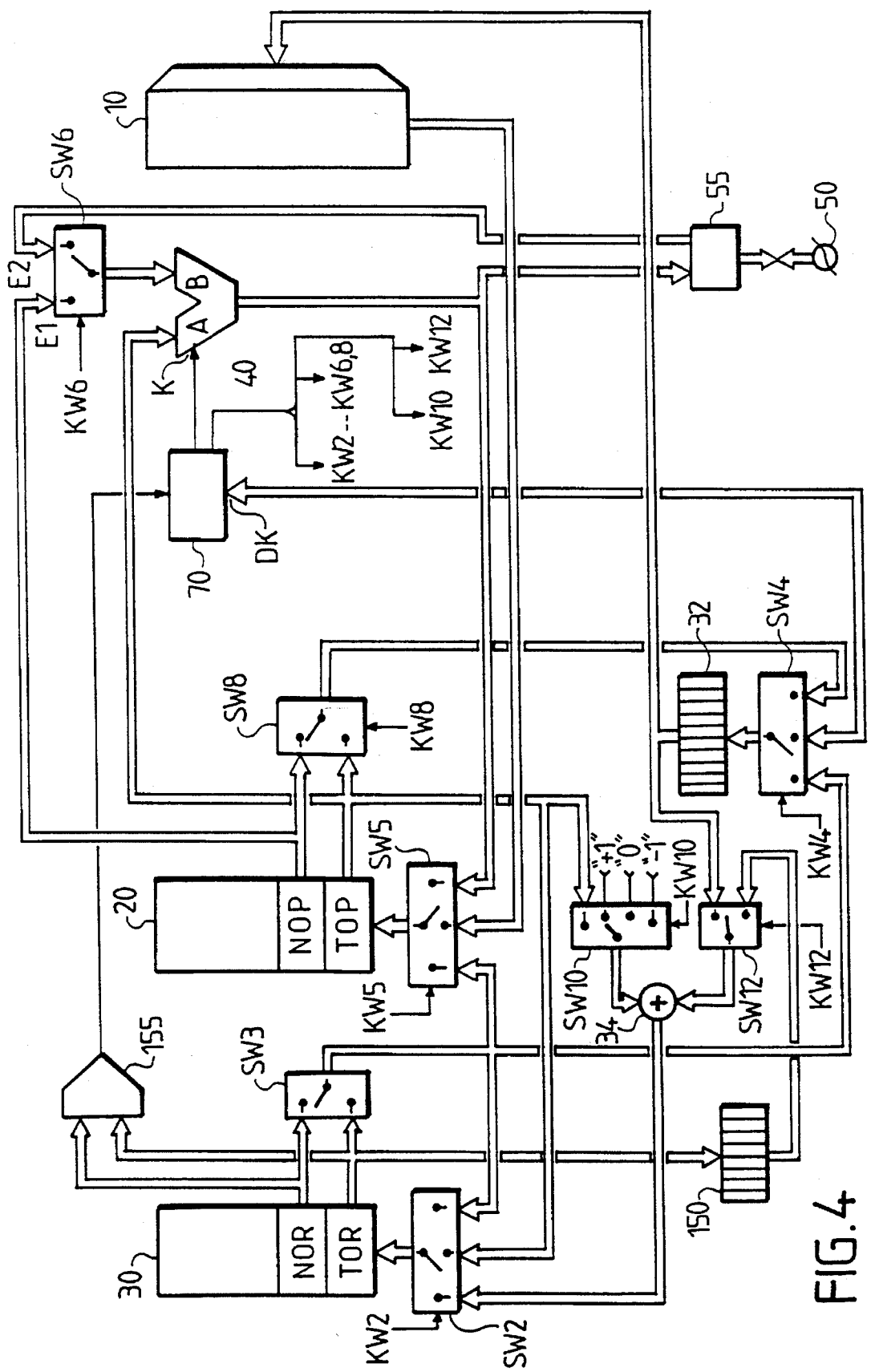
FIG. 4 shows the diagram of an alternative embodiment of a data processing device, including means for executing program loops.

FIG. 4 shows an alternative embodiment of the device according to the invention. In this Figure, elements corresponding to those of FIG. 1 have the same reference numerals. The device of FIG. 4 is provided with means which enable it to carry out program loops.

This device according to FIG. 4 differs from that of FIG. 1 first of all by the fact that the inputs of the adder 34 are connected to outputs of two switches SW10 and SW12. The switch SW10 is provided with four inputs which receive the signals representing the numbers +1, 0, −1, and the contents of the memory 20 defined by the position TOP, respectively. The switch SW10 is provided with two inputs. The first is connected to the output of the register 32 and the second to the output of an index register 150 whose input is connected to the position TOR of the stack memory 30.

The device of FIG. 4 differs from that of FIG. 1 also by the fact that a code comparator 155 is provided. The inputs thereof are connected to the positions NOR and TOR of the storage 30 and the output thereof to the input of the instruction decoding unit 70. This unit will supply the command signals KW10 and KW12 to the switches SW10 and SW12, respectively.

Figure 5:
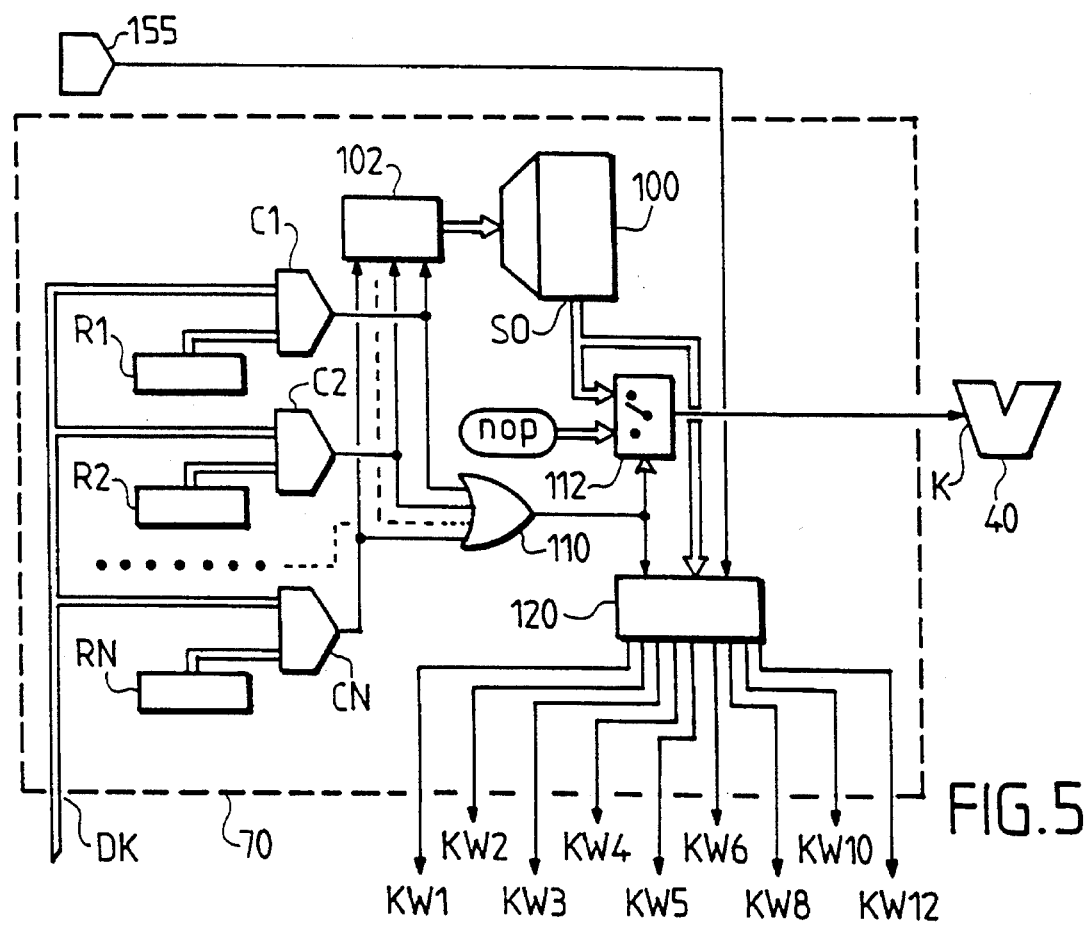
FIG. 5 shows in more detail the decoding unit suitable for the device according to the invention shown in FIG. 4.

The unit 70 in FIG. 4 is shown in more detail in FIG. 5. The signal coming from the comparator 155 is applied to the switching control unit 120.

The loop index is at TOR, the loop limit at NOR (loaded with two>R instructions), so that there is a memory configuration as shown in FIG. 6 in which LIM is the loop limit and INDX is the initialization of register 150, LIM and INDX being announced by CONST. A program loop then runs in the following manner:

| | |
|---|---|
| (32) +1 → TOR: | Stacking of the (32)+1 branch address. |
| [@(32)]$_{10}$: | The "loop" instruction is detected. |
| (TOR) → 32: | Unstacking of TOR. |
| (TOR) → 150: | Unstacking of the loop index. |
| (150)+1 → TOR: | Loop index is augmented by 1. |
| or | |
| (TOP) → TOR: | Loop index is increased by the value present in TOP. |
| | Note: TOR must not be unstacked during this operation. |
| [(155)]: | The equality of the contents at locations NOR and TOR is tested. |
| If there is equality | |
| (32)+1 → TOR: | End of loop (the branch address is jumped). |
| (TOR) → 32: | Next instruction. |
| If not | |
| (32)−1 → TOR: | The address of the loop instruction is restored. |
| [@(32)]$_{10}$ → 32: | Calling the sub-program. |

At the output it is necessary to transfer TOR and NOR in NOP and TOP in order to be able to erase them.

A loop instruction is arranged as follows: "limit", "index", ">R", ">R", "loop", "<address of call>", "R>", "DROP", "DROP".

ANNEX I
Executable instructions

In the following summary, PC represents the contents of the register 32. The normal cycle is PC+1 → TOR with stacking in (30), see FIG. 1. Unless indicated to the contrary, all data at the output of the memory 10 are considered as addresses of a sub-program.

NORMAL (calling a sub-program):
　　Base instruction
　　　If TOR → PC, unstacking of one element in memory (30)
　　　If NOR → PC, unstacking of two elements in (30).
1. PC + 1 → TOR (stacking)
2. M(PC) analysed as NORMAL by decoder 70.
3. M(PC) → PC PRIMITIVE RETURN:
　　Elementary instruction recognized by the operational unit with return to sub-program included m the instruction.
1. PC + 1 → TOR (stacking)
2. M(PC) analysed as PRIMITIVE RETURN
3. NOR → PC (unstacking of two elements)

PRIMITIVE RECURSIVE
　　Elementary instruction. The instruction executed subsequently is the next instruction in the memory.
1. PC + 1 → TOR (stacking)
2. M(PC) analysed as PRIMITIVE RECURSIVE
3. TOR → PC (unstacking)

CONSTANT (the value of the constant is correct after):
1. PC + 1 → TOR (stacking)
2. M(PC) analysed as CONSTANT, the next instruction will be forced as primitive.
3. TOR → PC (unstacking)
4. PC + 1 → TOR (stacking)
5. M(PC) ←→ TOP
6. TOR or NOR → PC (if CONSTANT RETURN or RECURSIVE), (unstacking 1 or 2).

TEST:
　　　Several options are possible:
　　. choice between TOR and NOR (RETURN or RECURSIVE form)
　　. inhibiting the +1 during the second read phase,
　　. choice between M(PC) and TOR during the second read phase.
　　　Several possible options are then seen:
1. PC + 1 → TOR (stacking)
2. M(PC) analysed as CONDITIONAL RETURN
3. TOR or NOR → PC subject to condition (unstacking 1 or 2)
　　　or alternatively:
1. PC + 1 → TOR (stacking)
2. M(PC) analysed as IF
3. TOR → PC (unstacking)
4. PC + 1 → TOR (stacking)
5. TOR → PC (unstacking) (no jump) or M(PC) → PC (jump) to sub-program
　　　or alternatively stiff:
1. PC + 1 → TOR (stacking)
2. M(PC) analysed as IF
3. TOR → PC (unstacking)
4. TOR → PC (return) or M(PC) → PC (jump) (without return).

FETCH or IMMEDIATE STORE:
　　　the data are in TOP and the address is m the program code.
1. PC + 1 → TOR (stacking)
2. M(PC) analysed as FETCH or IMMEDIATE STORE
3. TOR → PC (unstacking)
4. PC + 1 → TOR (stacking)
5. M(PC) → PC
6. M(PC) → TOP (subject to fetch or store)
7. TOR or NOR → PC (return or recursive form of instruction), (1 or 2 unstacking operations)

FETCH or STORE:
　　　here the address is in TOP and the data (in STORE) is in NOP.
1. PC + 1 → TOR (stacking)
2. M(PC) analysed as FETCH or STORE
3. TOP → PC (unstacking)
4. M(PC) ←→ TOP (subject to fetch or store)
5. TOR or NOR → PC (return or recursive form of instruction)

R> or >R:
　　　exchange of data between parameter stack (20) and return stack (30).
R> transfer from top of return stack (30) to top of stack (20).
>R transfer from top of stack (20) to top of return stack (30).

-continued

ANNEX I
Executable instructions

1. PC + 1 → TOR (stacking)
2. M(PC) analysed as R > or >R
3. TOR → PC (unstacking)
4. TOR ←→ TOP (subject to >R or R>).

ANNEX II
Execution of program example APPEL = CALL carré = square

| Prog. step | Instruction | (32) | [@(32)$_{10}$] | Return stack |
|---|---|---|---|---|
| 1 | (32)+1→TOR | @APPEL−2 | CONST | [@APPEL−1] |
| 2 | [@(32)]$_{10}$ | — | | [@APPEL−1] |
| 3 | (TOR)→32 | @APPEL−1 | a | — |
| 4 | (32)+1→TOR | @APPEL−1 | a | [@APPEL] |
| 5 | [@(32)]$_{10}$→TOP | | | |
| 6 | (TOR)→32 | @APPEL | @P4 | — |
| 7 | (32)+1→TOR | @APPEL | @P4 | [@APPEL+1] |
| 8 | [@(32)]$_{10}$ | @P4 | @carré | |
| 9 | [@(32)]$_{10}$→32 | @P4 | @carré | |
| 10 | (32)+1→TOR | @P4 | @carré | [@P4+1][@APPEL+1] |
| 11 | [@(32)]$_{10}$ | @carré | DUP | |
| 12 | [@(32)]$_{10}$→32 | @carré | DUP | [@P4+1][@APPEL+1] |
| 13 | (32)+1→TOR | @carré | DUP | [@carré+1][@P4+1] [@APPEL+1] |
| 14 | [@(32)]$_{10}$ | @carré | DUP | |
| 15 | (TOR)→32 | @carré | @* | [@P4+1][@APPEL+1] |
| 16 | (32)+1→TOR | @carré+1 | @* | [@carré+1][@P4+1] [@APPEL−1] |
| 17 | [@(32)]$_{10}$ | @carré+1 | @* | |
| 18 | [@(32)]$_{10}$→32 | @* | INM1 | [@carré+2][@P4+1] [@APPEL+1] |

Execution of multiplication by addition and shifting

| | | | | |
|---|---|---|---|---|
| 19 | (32)+1→TOR | @*F | | [@*F+1][@carré+1] [@P4+1][@APPEL+1] |
| 20 | [@(32)]$_{10}$ | | | |
| 21 | (NOR)→32 | @carré+2 | | [@P4+1][@APPEL+1] |
| 22 | (32)+1→TOR | @carré+2 | IR | [@carré+3][@P4+1] [@APPEL+1] |
| 23 | [@(32)]$_{10}$ | | | |
| 24 | (NOR)→32 | @P4+1 | @carré | [@APPEL+!] |
| 25 | (32)+1→TOR | @P4+1 | @carré | [@P4+2][@APPEL+1] |
| 26 | [@(32)]$_{10}$ | | | |
| 27 | [@(32)]$_{10}$→32 | @carré | DUP 13 | [@P4+2][@APPEL+1 |
| 28 | (32)+1→TOP | @carré+2 | ; | [@carré+3][@P4+2] [@APPEL+1] |
| 29 | [@(32)]$_{10}$ | | | |
| 30 | (NOR)→32 | @P4+2 | ; | [@APPEL+1] |
| 31 | (32)+1→TOR | @P4+2 | ; | [@P4+3][@APPEL+1] |
| 32 | [@(32)]$_{10}$ | | | |
| 33 | (NOR)→32 | [@APPEL+1] | | |

I claim:

1. A data processor for executing a computer program in a FORTH-like language, which program contains a sequence of instructions, some of which instructions are directly executable on the hardware of the processor and others of which instructions are part of a repertory of indirectly executable instructions, each of which indirectly executable instructions is associated with a respective associated subprogram, said data processor comprising:

a) a main memory for storing the program, including those instructions which are indirectly executable, and the associated subprograms;

b) a first stack-type memory for containing a calling address for calling a called one of said associated sub-programs and a return address following the calling address;

c) at least one operational unit for directly executing instructions;

d) a second stack-type memory for containing parameters used by said program and the associated sub-programs; and e) at least one instruction-decoding member associated with the at least one operational unit, the instruction-decoding member including i) means for comparing instructions in the sequence of instructions with a set of directly executable instructions; and ii) means, responsive to the means for comparing, for
         A) causing direct execution of the directly executable instructions from the program; or B) calling, using addresses in the first stack-type memory, relevant ones of the associated subprograms for instructions in the program that are part of the repertory, so that a programmer or compiler writing the program need not mark the sequence of instructions indicating which instructions are directly executable and which are in the repertory, and so that the program can be readily ported from the data processor to another processor which other processor either directly executes at least one instruction from the repertory of the data processor or does not directly execute one instruction which is directly executable in the data processor.

2. A data processor as claimed in claim 1 for executing said program written in Forth language.

3. A data processor as claimed in claim 1 wherein said recognizing means is an associative memory contained in the instruction decoder.

4. A data processing device as claimed in claim 1, characterized in that it comprises the following means for carrying out program loops:

a register incrementer-decrementer for incrementing an index register, a decoder for decoding the writing end of the loop, coupled to one of the stack memories containing the end of the loop and on the to the index register, and for acting on the instruction decoding member so as to ensure the correct execution of the loop.

5. A data processor as claimed in claim 2 wherein said recognizing means is an associative memory contained in the instruction decoder.

6. A data processing device as claimed in claim 2, characterized in that it comprises the following means for carrying out program loops:

a register incrementer-decrementer for incrementing an index register, a decoder for decoding the writing end of the loop, coupled to one of the stack memories containing the end of the loop and to the index register, and for acting on the instruction decoding member so as to ensure the correct execution of the loop.

7. A data processing device as claimed in claim 3, characterized in that it comprises the following means for carrying out program loops:

a register incrementer-decrementer for incrementing an index register, a decoder for decoding the writing end of the loop, coupled to one of the stack memories containing the end of the loop and to the index register, and for acting on the instruction decoding member so as to ensure the correct execution of the loop.

8. A data processing device as claimed in claim 5, characterized in that it comprises the following means for carrying out program loops:

a register incrementer-decrementer for incrementing an index register, a decoder for decoding the writing end of the loop, coupled to one of the stack memories containing the end of the loop and to the index register, and for acting on the instruction decoding member so as to ensure the correct execution of the loop.

* * * * *